(12) United States Patent
Dellacona et al.

(10) Patent No.: US 9,425,644 B1
(45) Date of Patent: Aug. 23, 2016

(54) METHOD AND APPARATUS FOR CHARGING AN ELECTRICALLY CHARGEABLE DEVICE UTILIZING RESONATING MAGNETIC OSCILLATIONS IN THE APPARATUS

(71) Applicant: THOR CHARGER COMPANY, Corona Del Mar, CA (US)

(72) Inventors: Richard Dellacona, Newport Beach, CA (US); Robert Daniel Arnon, Newport Beach, CA (US)

(73) Assignee: THOR CHARGER COMPANY, Corona Del Mar, CA (US)

( * ) Notice: Subject to any disclaimer, the term of this patent is extended or adjusted under 35 U.S.C. 154(b) by 0 days.

(21) Appl. No.: 14/730,026

(22) Filed: Jun. 3, 2015

(51) Int. Cl.
*H02J 7/00* (2006.01)
*H02J 7/02* (2016.01)
*H01F 41/06* (2016.01)

(52) U.S. Cl.
CPC ............... *H02J 7/025* (2013.01); *H01F 41/06* (2013.01); *H02J 7/0042* (2013.01); *H02J 7/0052* (2013.01)

(58) Field of Classification Search
CPC ....... H02J 7/025; H02J 7/0042; H02J 7/0052; H01F 41/06
USPC ................................. 320/108, 107; 323/253
See application file for complete search history.

(56) References Cited

U.S. PATENT DOCUMENTS

| | | | |
|---|---|---|---|
| 2,313,938 A * | 3/1943 | Hall, Jr. .................. | H01F 38/04 363/170 |
| 2,399,185 A | 4/1946 | Hedding | |
| 3,086,159 A * | 4/1963 | Daly ......................... | H02J 7/12 320/162 |
| 3,418,563 A | 12/1968 | Grosu | |
| 3,457,492 A | 7/1969 | Rabanit | |
| 3,772,565 A | 11/1973 | Lenz et al. | |
| 4,328,458 A * | 5/1982 | Hiromitsu ............... | H01F 29/14 307/17 |
| 4,488,136 A | 12/1984 | Hansen et al. | |
| 4,574,222 A | 3/1986 | Anderson | |
| 4,687,947 A * | 8/1987 | Cobb ....................... | H01F 30/10 307/17 |
| 4,766,365 A | 8/1988 | Bolduc et al. | |
| 4,876,638 A * | 10/1989 | Silva ........................ | H01F 29/14 323/250 |
| 5,349,173 A | 9/1994 | Scheckel et al. | |
| 5,670,862 A | 9/1997 | Lewyn | |
| 6,002,237 A | 12/1999 | Gaza | |
| 6,297,616 B1 * | 10/2001 | Kubo ..................... | H02J 7/0027 320/116 |
| 6,807,069 B2 * | 10/2004 | Nieminen ......... | H02M 3/33561 363/17 |
| 6,822,546 B1 * | 11/2004 | Jakab ....................... | H01F 21/08 336/170 |

(Continued)

FOREIGN PATENT DOCUMENTS

| | | |
|---|---|---|
| CN | 1269616 | 10/2000 |
| JP | 2000-277151 | 10/2000 |

(Continued)

*Primary Examiner* — Nathaniel Pelton
(74) *Attorney, Agent, or Firm* — Knobbe Martens Olson & Bear LLP

(57) ABSTRACT

An apparatus for charging an electrically chargeable device is provided. The apparatus comprises a core structure. The core structure comprises a first portion common to each of a first magnetic flux circuit in the core structure and a second magnetic flux circuit in the core structure. The core structure comprises a second portion included in the first magnetic flux circuit and not included in the second magnetic flux circuit. The apparatus comprises a first coil wound on or around the first portion and configured to be driven by an alternating voltage. The apparatus comprises a second coil wound on or around the second portion and configured to be electrically coupled to the electrically chargeable device.

16 Claims, 4 Drawing Sheets

(56) References Cited

U.S. PATENT DOCUMENTS

| | | | |
|---|---|---|---|
| 6,859,014 B2 | 2/2005 | Bohne et al. | |
| 7,034,647 B2 * | 4/2006 | Yan | H01F 27/38 336/178 |
| 7,042,323 B2 | 5/2006 | Joerg et al. | |
| 7,847,664 B2 | 12/2010 | Dellacona | |
| RE44,038 E | 3/2013 | Cho | |
| 8,432,125 B2 | 4/2013 | Takada et al. | |
| 8,716,974 B2 | 5/2014 | Sakoda et al. | |
| 2001/0011882 A1 | 8/2001 | Maloizel et al. | |
| 2002/0117896 A1 | 8/2002 | Gohara | |
| 2003/0057920 A1 | 3/2003 | Dotzler | |
| 2003/0141850 A1 | 7/2003 | Dotzler et al. | |
| 2004/0036454 A1 * | 2/2004 | Joerg | H01F 19/08 323/251 |
| 2005/0135122 A1 | 6/2005 | Cheng et al. | |
| 2008/0157603 A1 | 7/2008 | Baarman et al. | |
| 2008/0191638 A1 | 8/2008 | Kuennen et al. | |
| 2008/0231120 A1 | 9/2008 | Jin | |
| 2009/0021219 A1 | 1/2009 | Yoda et al. | |
| 2009/0051224 A1 | 2/2009 | Cook et al. | |
| 2009/0058189 A1 * | 3/2009 | Cook | H04B 5/0037 307/104 |
| 2009/0058190 A1 | 3/2009 | Tanaka | |
| 2009/0085408 A1 | 4/2009 | Bruhn | |
| 2010/0327824 A1 * | 12/2010 | Dellacona | G05F 1/335 323/253 |
| 2011/0248673 A1 | 10/2011 | Aerts et al. | |
| 2012/0206060 A1 * | 8/2012 | Beyer | H01F 27/2804 315/255 |
| 2013/0069587 A1 | 3/2013 | Kuk | |
| 2014/0103870 A1 | 4/2014 | Baarman et al. | |
| 2015/0042271 A1 | 2/2015 | Nakagawa et al. | |
| 2015/0054452 A1 | 2/2015 | Ahn | |
| 2015/0061579 A1 | 3/2015 | Katsunaga et al. | |

FOREIGN PATENT DOCUMENTS

| | | |
|---|---|---|
| WO | WO 2009/027674 A1 | 3/2009 |
| WO | WO 2010/030977 A2 | 3/2010 |
| WO | WO 2010/067763 A1 | 6/2010 |

* cited by examiner

US 9,425,644 B1

METHOD AND APPARATUS FOR CHARGING AN ELECTRICALLY CHARGEABLE DEVICE UTILIZING RESONATING MAGNETIC OSCILLATIONS IN THE APPARATUS

FIELD

This application is generally related to charging of electrically chargeable devices, and more specifically to methods and apparatuses for charging an electrically chargeable device utilizing resonating magnetic oscillations in the apparatus.

BACKGROUND

Conventional electrical battery chargers tend to have non-uniform rates of charging as an internal voltage of the cells of a battery under charge increases. This occurs as a consequence of a reduction in the charging current flowing into the battery, which is proportional to a decreasing voltage differential between a charging voltage and the rising voltage of the cells of the charging battery. This results in undesirable increases in total charge time for the battery. Some conventional electrical battery chargers attempt to solve this problem by providing a constant charging current driven by a charging voltage that rises in step with the voltage of the cells of the charging battery. However, such chargers require additional control circuitry, which increases the complexity and manufacturing costs associated with such chargers. In addition, conventional chargers suffer from increased energy losses associated with electrical resistance and heat production resulting from such conventional chargers operating substantially completely in the electrical, rather than in the magnetic domain. Accordingly, methods and apparatuses for charging an electrically chargeable device utilizing resonating magnetic oscillations in the apparatus are desirable.

SUMMARY

According to some implementations, an apparatus for charging an electrically chargeable device is provided. The apparatus comprises a core structure. The core structure comprises a first portion common to each of a first magnetic flux circuit in the core structure and a second magnetic flux circuit in the core structure. The core structure comprises a second portion included in the first magnetic flux circuit and not included in the second magnetic flux circuit. The apparatus comprises a first coil wound on or around the first portion and configured to be driven by an alternating voltage. The apparatus comprises a second coil wound on or around the second portion and configured to be electrically coupled to the electrically chargeable device.

In some other implementations, a method for charging an electrically chargeable device is provided. The method comprises driving a first coil with an alternating voltage. The first coil is wound on or around a first portion of a core structure common to each of a first magnetic flux circuit in the core structure and a second magnetic flux circuit in the core structure. Driving the first coil with the alternating voltage causes a second coil to generate a charging current for the electrically chargeable device. The second coil is wound on or around a second portion of the core structure that is included in the first magnetic flux circuit and not included in the second magnetic flux circuit.

In yet other implementations, a method for manufacturing an apparatus for charging an electrically chargeable device is provided. The method comprises winding a first coil around a first portion of a core structure, the first portion common to each of a first magnetic flux circuit in the core structure and a second magnetic flux circuit in the core structure. The method comprises winding a second coil around a second portion of the core structure, the second portion included in the first magnetic flux circuit and not included in the second magnetic flux circuit.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1A:
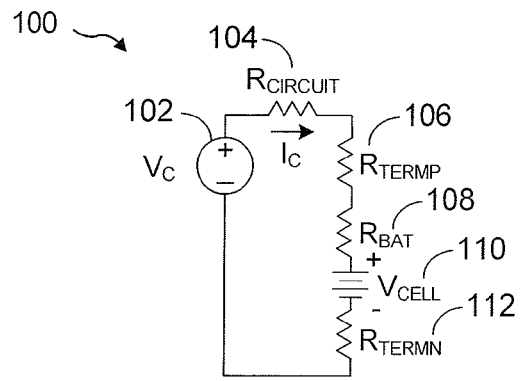
FIG. 1A is a schematic diagram of a generalized conventional electric charger, in accordance with some implementations.

FIG. 1A is a schematic diagram 100 of a generalized conventional electric charger, in accordance with some implementations. FIG. 1A includes a voltage source 102 providing a constant or variable direct current (DC) voltage $V_C$. The voltage source 102 is connected in series with each of a plurality of resistances illustrating intrinsic resistances of different portions of a conventional electric charging circuit and a voltage source 110 corresponding to a charge voltage of the cells of the battery $V_{CELL}$. For example, a resistance $R_{CIRCUIT}$ corresponding to all intrinsic resistance of the circuitry between the voltage source 102 and a chargeable battery is represented by a resistor 104. A resistance $R_{TERMP}$ corresponding to a resistance of a positive terminal of the chargeable battery is represented by a resistor 106. A resistance $R_{BAT}$ corresponding to an intrinsic internal resistance of the chargeable battery is represented by a resistor 108. And a resistance $R_{TERMN}$ corresponding to a resistance of a negative terminal of the chargeable battery is represented by a resistor 112.

Figure 1B:
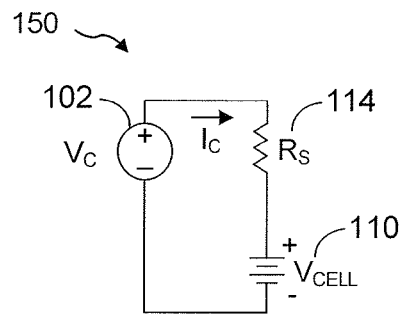
FIG. 1B is a simplified, equivalent schematic diagram of the generalized conventional electric charger of FIG. 1A.

FIG. 1B is a simplified, equivalent schematic diagram 150 of the generalized conventional electric charger of FIG. 1A. Each of the resistors 104, 106, 108 and 112 may be simplified and combined into an equivalent resistor 114 having a resistance $R_S$ equivalent to the sum of the resistances of all of the resistors 104, 106, 108 and 112. Thus, the diagram 150 includes the voltage source 102 providing the charging voltage $V_C$ connected in series with the resistor 114 and the voltage source 110. Accordingly to Ohm's Law, the charging current $I_C$ is proportional to the voltage difference across the resistor 114 ($V_C$-$V_{CELL}$) and inversely proportional to the resistance $R_S$ of the resistor 114. Thus, the current IC can be described according to Equation 1.

$$I_C = (V_C - V_{CELL})/R_S \qquad \text{EQ. 1:}$$

Thus, as the battery begins to charge, $V_{CELL}$ will rise. If $V_C$ remains constant, the falling voltage differential $V_C$-$V_{CELL}$ this will cause a proportional reduction in the charging current $I_C$, a concomitant reduction in electrical charging power transferred to the battery, and a proportional increase in the charging time. Conventional chargers attempt to circumvent this effect by providing additional circuitry (not shown) for monitoring this increase in $V_{CELL}$ and counteracting it by increasing $V_C$ a similar amount. Such implementations provide a constant current charging operation by maintaining a predetermined voltage differential between $V_C$ and $V_{CELL}$ that will provide the desired constant charging current $I_C$. However, such implementations are more complicated and require the above-mentioned additional monitoring circuitry as well as additional counteracting circuitry responsible for varying the voltage $V_C$. This results in both added engineering and manufacturing expenses for such chargers. In addition, since the charger circuits are essentially completely electrical (rather than magnetic), non-negligible energy is lost as heat generated by driving the charging current $I_C$ through the resistances of the electric circuits and generated by rectification stages (not shown) that are required when powering such DC electric charging designs with an AC source, such as a 110 VAC wall outlet. The present application provides apparatuses for charging electrically chargeable devices utilizing resonating magnetic oscillations in the apparatus that overcome the above-mentioned short-falls of these conventional DC electrical charger designs.

Figure 2:
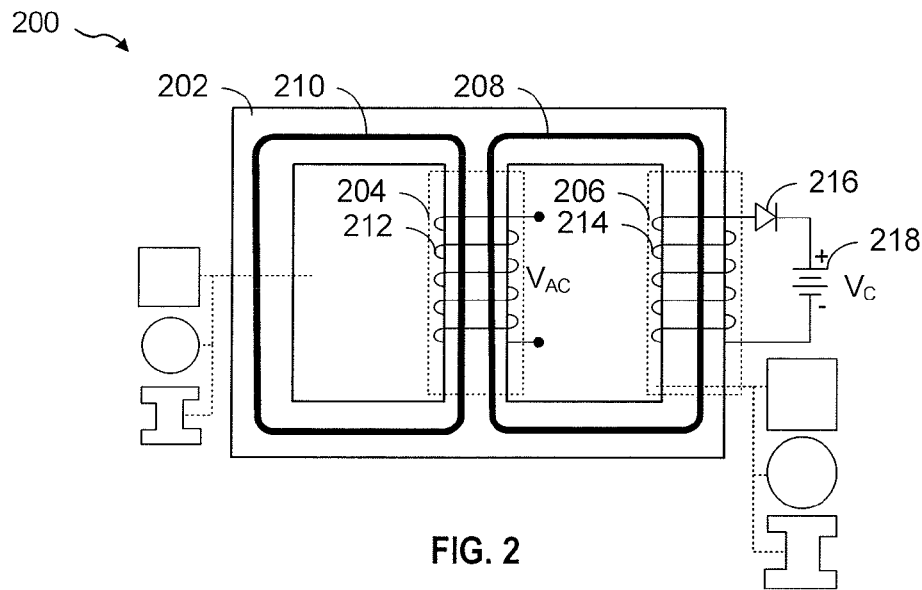
FIG. 2 is a hybrid schematic/functional block diagram of an apparatus for charging an electrically chargeable device utilizing resonating magnetic oscillations in the apparatus, in accordance with some implementations.

FIG. 2 is a hybrid schematic/functional block diagram of an apparatus 200 for charging an electrically chargeable device utilizing resonating magnetic oscillations in the apparatus, in accordance with some implementations. The apparatus 200 comprises a core structure 202. In some implementations the core structure 202 comprises a material with high relative permeability $\mu_0$ and a relatively high resistivity $\Omega m$ (e.g., a ferrimagnetic material, such as iron or ferrite). In some other implementations, the core structure 202 may comprise another material that is not magnetic or ferrimagnetic but that provides a structure upon or around which to wind one or more coils of wire, e.g., as in the use of an air core or where portions of magnetic flux flow through air. The core structure 202 may comprise at least a first portion 204, on or around which a first coil 212 may be wound, and a second portion 206 different from the first portion 204, on or around which a second coil 214 may be wound. The core structure 202 may have any physical structure that provides at least a first closed magnetic flux circuit 208 and a second closed magnetic flux circuit 210. The first closed magnetic flux circuit 208 includes the first portion 204 and the second portion 206, passes through the windings of both the first coil 204 and the second coil 206, and has a first reluctance value $R_1$. The second magnetic flux circuit 210 includes the first portion 204 but not the second portion 206, passes through the windings of the first coil 212 but not the windings of the second coil 214, and has a second reluctance value $R_2$. The reluctance of a uniform magnetic circuit or flux circuit may be calculated according to Equation 2.

$$R = l/(\mu A) \qquad \text{EQ. 2:}$$

where R is the reluctance of the flux circuit, l is the length of the flux circuit, and A is the cross sectional area of the flux circuit. Thus, the reluctance of a particular uniform cross-sectioned, uniform material flux circuit is proportional to its length and inversely proportional to its cross sectional area. Of course, where a particular flux circuit has a variable cross section across its length, the total reluctance of that flux circuit over the total length would be the sum of the reluctances of each section having a particular cross section for a particular portion of the total length. This may be determined by taking the integral of the varying cross section along the length of flux circuit in question utilizing Equation 2.

In some implementations, the second coil 214 may be configured to be connected in series with a diode 216 and a chargeable battery 218. Although a chargeable battery 218 is shown, the present application also contemplates substitution of any type of capacitor for the battery, or direct connection with circuitry in an electrically chargeable device. Thus, the use of the term "electrically chargeable device" with respect to any aspect of the present application, including the claims, may be considered to include a capacitor, a battery, an entire electrically chargeable device such as a smart phone, or any combination thereof. In some implementations, the first coil may be configured to be connected to an alternating current (AC) voltage source configured to provide an AC voltage $V_{AC}$ across the terminals of the first coil 212.

The core structure 202 has a physical structure such that the second reluctance R 2 of the second magnetic flux circuit 210 is greater than the first reluctance R 1 of the first magnetic flux circuit 208 when the first coil 204 is driven by a first half cycle of the AC voltage $V_{AC}$ (e.g., either the positive half cycle or the negative half cycle) and any compatible chargeable battery 218 in any state of charge is electrically coupled to the second coil 206 (e.g., the chargeable battery 218 loads the second coil 206). Such a physical structure should also result in the second reluctance R 2 of the second magnetic flux circuit 210 being less than the first reluctance R 1 of the first magnetic flux circuit 208 when the first coil 204 is driven by a second half cycle of the AC voltage $V_{AC}$ (e.g., either the negative half cycle or the positive half cycle, respectively) and the chargeable battery 218 is electrically coupled to the second coil 206 (e.g., the chargeable battery 218 loads the second coil 206). In some implementations, this may be accomplished at least in part by the portion(s) of the second magnetic flux circuit 210 not shared by the first magnetic flux circuit 208 having a greater length l, a smaller cross sectional area A (e.g., sometimes varying), or at least partial construction from a lower permeability $\mu_o$ material (e.g., another ferrimagnetic material or an air gap) as compared to the portion(s) of the first magnetic flux circuit 208 not shared by the second magnetic flux circuit 210. As shown, the cross section of portions of the core structure 202 may have any shape (e.g., square, rectangular, circular, elliptical, hexagonal, irregular, or any other shape).

These relative reluctance-based features of the core structure 202 ensure that a majority of magnetic flux Θ induced in the core structure 202 by a current circulating in the first coil 212 (and/or a total amount of magnetic flux Θ) will selectively flow through the first magnetic flux circuit 208 during the first half cycle of the AC voltage $V_{AC}$, while a majority of magnetic flux Θ induced in the core structure 202 by a current circulating in the first coil 212 (and/or a total amount of magnetic flux Θ) will selectively flow through the second magnetic flux circuit 210 during the second half cycle of the AC voltage $V_{AC}$. This will be described in more detail in connection with each of FIGS. 3-6 below. Moreover, although a battery 218 is shown, a capacitor or a load of a chargeable device may replace or be connected in parallel with the battery 218.

Figure 3:
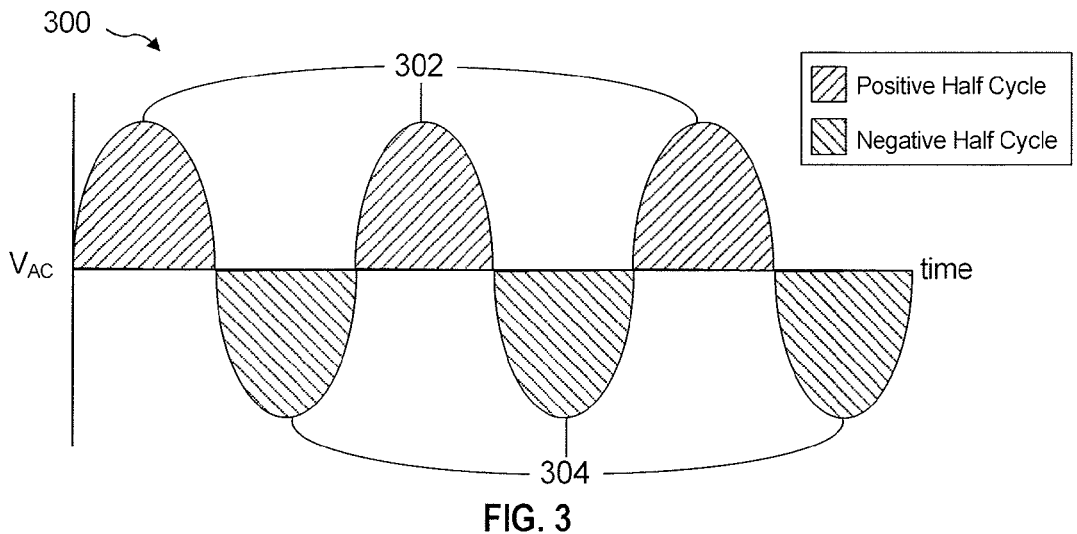
FIG. 3 is a timing diagram of an alternating voltage waveform utilized to drive the first coil of the apparatus of FIG. 2, in accordance with some implementations.

FIG. 3 is a timing diagram 300 of an alternating voltage $V_{AC}$ waveform utilized to drive the first coil 212 of the apparatus 200 of FIG. 2, in accordance with some implementations. The waveform of $V_{AC}$ is shown as a substantially sinusoidal waveform, although any alternating waveform may also be contemplated. The $V_{AC}$ waveform comprises a plurality of positive half cycles 302 separated by or preceding a plurality of negative half cycles 304. When the first coil 212 of the apparatus 200 of FIG. 2 is driven with the positive half cycles 302 of the $V_{AC}$ waveform a current will flow in a first direction in the first coil 212. When the first coil 212 is driven with the negative half cycles 304 a current will flow in a second direction, opposite the first direction, in the first coil 212. In some implementations, the positive half cycles 302 may correspond to a "first half cycle" of the voltage waveform $V_{AC}$, while the negative half cycles 304 may correspond to the "second half cycle" of the voltage waveform $V_{AC}$. In some other implementations, these conventions may be reversed.

Figure 4:
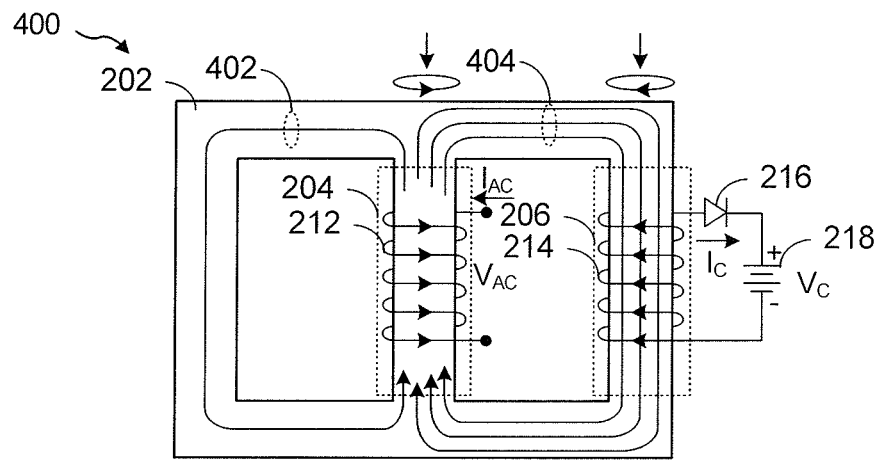
FIG. 4 is a hybrid schematic/functional block diagram of the apparatus of FIG. 2 operating under application of a positive half cycle of the alternating voltage shown in FIG. 3, in accordance with some implementations.

FIG. 4 is a hybrid schematic/functional block diagram 400 of the apparatus 200 of FIG. 2 operating under application of a positive half cycle of the alternating voltage $V_{AC}$ shown in FIG. 3, in accordance with some implementations. The diagram 400 shows substantially all of the same features as previously described in connection with FIG. 2. Thus, the same numerals have been utilized for the same features. In FIG. 4, the first coil 212 is driven with a first half cycle (e.g., the positive half cycle) of the alternating voltage $V_{AC}$. A current $I_{AC}$ is driven by $V_{AC}$ through the first coil 212 in a counter-clockwise direction when viewed in the direction of the arrow down at the first coil 212 as a result. According to the right-hand rule, the current $I_{AC}$, circulating counter-clockwise in the first coil 212, causes magnetic flux Θ 402, 404 to flow in the core structure 202 as shown by the arrows circulating in the first and second magnetic flux circuits. As shown, the magnetic flux Θ 402, 404 circulate in opposite clockwise and counter-clockwise directions from one another. Since the reluctance R 2 of the second magnetic flux circuit is greater than the reluctance R 1 of the first magnetic flux circuit when the positive half cycle of the alternating voltage $V_{AC}$ drives the first coil 212, substantially more magnetic flux Θ 404 flows in the first magnetic flux circuit as compared to the magnetic flux Θ 402 flowing in the second magnetic flux circuit. The magnetic flux Θ 402 flowing in the second magnetic flux circuit will circulate as a pool of magnetic flux Θ during the positive half cycle of the alternating voltage $V_{AC}$. However, the magnetic flux Θ 404 flows through the first magnetic flux circuit, passing through the second portion 206 of the core structure 202, on or around which is wound the second coil 214. This causes a charging current $I_C$ to flow in the second coil 206 in the direction shown by the arrows (e.g., clockwise when viewed in the direction of the arrow down at the second coil 214). The polarity of a voltage induced across the terminals of the second coil 214, that drives the charging current $I_C$, forward-biases the diode 216 and the charging current $I_C$ flows into the battery 218, charging the battery 218.

In such an implementation, the battery 218 will accept as much current (e.g., $I_C$) as it is able. If a voltage induced in the second coil 214 by the magnetic flux Θ 404 rises such that the current $I_C$ is too large for the battery 218 to absorb, the battery 218 will resist this increase in $I_C$ as the voltage induced in the second coil 214 rises. This tendency of the induced voltage across the second coil 214 to rise without an attendant increase in the charging current $I_C$ will cause an induced magneto-motive force (MMF) in the first magnetic flux circuit in the direction opposite of that induced by the first coil 212, which has the net effect of increasing the first reluctance R 1 of the first magnetic flux circuit, causing a shunt of some of the magnetic flux Θ 404 from the first magnetic circuit to the second magnetic circuit. In some implementations, this increase in magnetic flux may saturate the second magnetic flux circuit. Thus, the second magnetic flux circuit acts similar to a flyback or pressure relief circuit for the first magnetic flux circuit in the event that enough magnetic flux Θ 404 flows in the first magnetic circuit to cause an induced voltage in excess of that rated for charging the battery 218 in the second coil 214 and a charging current $I_C$ in excess of that receivable by the battery 218. This flyback or pressure relief operation may substantially eliminate (or substantially reduce to a negligible value) any bucking in the induction process at the second coil 214 and prevent associated inefficiency, heat production, and power loss in the apparatus 200. It is by this shunting of excess magnetic flux from the first magnetic flux circuit to the second magnetic flux circuit that regulation is achieved without the requirement of active components. Thus, no more than the maximum voltage is accepted by the load (e.g., by a capacitor, a battery, or an electrically chargeable device including the capacitor or battery) and this is accomplished without the use of additional, dedicated active components, such as transistors or integrated circuits. The threshold of magnetic flux Θ 404 at which such a flyback or pressure relief function of the second magnetic flux circuit begins to operate may be predetermined. In some implementations, this threshold of magnetic flux may be based on a differential between the designed intrinsic reluctances $R\,1$ and $R\,2$ of the first and second magnetic flux circuits, respectively, a voltage appearing across the terminals of the battery 218, and/or a maximum receivable charging current $I_C$. Consequently this threshold of magnetic flux may also be based at least in part on a type or chemistry of the battery 218, which will at least partly determine the voltage of the battery 218 in charged and discharged states, as well as determine the associated maximum receivable charging current. Although clockwise and counter-clockwise conventions are described above, they are not limiting and may be reversed from one another since they are based on the particular implementation shown in FIG. 4.

Figure 5:
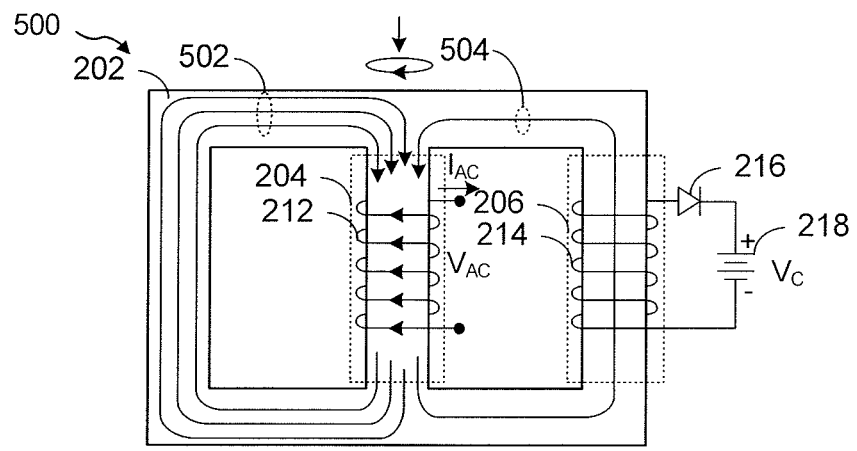
FIG. 5 is a hybrid schematic/functional block diagram of the apparatus of FIG. 2 operating under application of a negative half cycle of the alternating voltage shown in FIG. 3, in accordance with some implementations.

FIG. 5 is a hybrid schematic/functional block diagram 500 of the apparatus 200 of FIG. 2 operating under application of a negative half cycle of the alternating voltage $V_{AC}$ shown in FIG. 3, in accordance with some implementations. The diagram 500 shows substantially all of the same features as previously described in connection with FIG. 2. Thus, the same numerals have been utilized for the same features. In FIG. 5, the first coil 212 is now driven with a second half cycle (e.g., the negative half cycle) of the alternating voltage $V_{AC}$. The current $I_{AC}$ is now driven by $V_{AC}$ through the first coil 212 in a clockwise direction when viewed in the direction of the arrow down at the first coil 212. According to the right-hand rule, the current $I_{AC}$, circulating clockwise in the first coil 212, causes magnetic flux Θ 502, 504 to flow in the core structure 202 as shown by the arrows circulating in the first and second magnetic flux circuits. As shown, the magnetic flux Θ 502, 504 circulate in opposite clockwise and counter-clockwise directions from one another. These directions of circulation are opposite from those previously described for magnetic flux Θ 402, 404, with respect to FIG. 4. The magnetic flux Θ 504 flows through the first magnetic flux circuit, passing through the second portion 206 of the core structure 202, on or around which is wound the second coil 214. The polarity of a voltage induced across the terminals of the second coil 214 now reverse-biases the diode 216, preventing any current from flowing into or out of the battery 218, thus at least partially preventing any discharging of the battery 218 during this cycle. Since the reluctance $R\,2$ of the second magnetic flux circuit is less than the reluctance $R\,1$ of the first magnetic flux circuit when the negative half cycle of the alternating voltage $V_{AC}$ drives the first coil 212, substantially more magnetic flux Θ 502 flows in the second magnetic flux circuit as compared to the magnetic flux Θ 504 flowing in the first magnetic flux circuit. The magnetic flux Θ 504 flowing in the first magnetic flux circuit will circulate providing a pool of magnetic flux Θ during the negative half cycle of the alternating voltage $V_{AC}$. Although clockwise and counter-clockwise conventions are described above, they are not limiting and may be reversed from one another since they are based on the particular implementation shown in FIG. 5.

Figure 6:
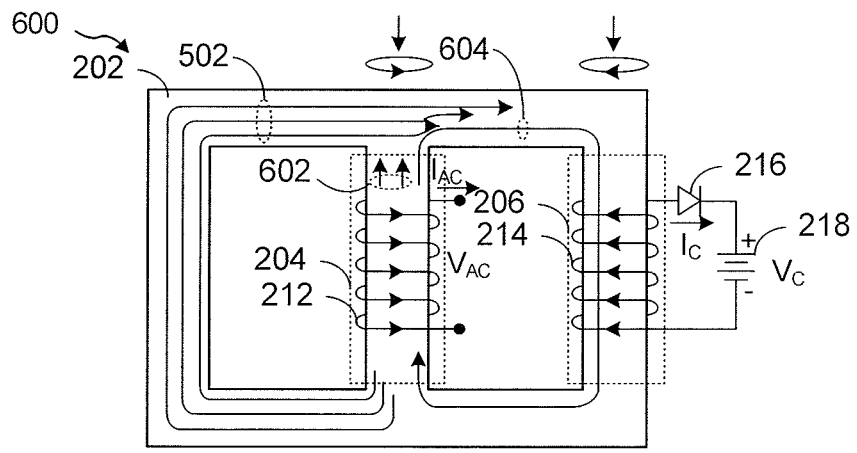
FIG. 6 is a hybrid schematic/functional block diagram of the apparatus of FIG. 2 operating at a transition between the negative half cycle and a subsequent positive half cycle of the alternating voltage shown in FIG. 3, in accordance with some implementations.

FIG. 6 is a hybrid schematic/functional block diagram 600 of the apparatus 200 of FIG. 2 operating at a transition between the negative half cycle and a subsequent positive half cycle of the alternating voltage $V_{AC}$ shown in FIG. 3, in accordance with some implementations. The operation shown in FIG. 6 may apply after at least one full cycle of $V_{AC}$ has been driven to the first coil 212 including the operation shown in FIG. 4 for the positive half-cycle of $V_{AC}$ and the operation shown in FIG. 5 for the negative half-cycle of $V_{AC}$. FIG. 6 shows the magnetic flux Θ 502, previously described in FIG. 5, that was previously circulating in the second magnetic flux circuit as a pool of magnetic flux during the previous negative half-cycle of $V_{AC}$. Now, since as the first coil 212 begins to be driven with a subsequent positive half-cycle of $V_{AC}$, the reluctance $R\,1$ of the first magnetic flux circuit will become less than the reluctance $R\,2$ of the second magnetic flux circuit. According to the right-hand rule, a magnetomotive force (MMF) is again induced in the first portion 204 in the direction of the arrows of the magnetic flux Θ lines 602. This MMF opposes the previous circulation of the magnetic flux Θ 502 back into the first portion 204, causing the magnetic flux Θ 502 to flow into the current lower reluctance first magnetic flux circuit from the second magnetic flux circuit. This pool of magnetic flux Θ 502 may add to the newly circulating magnetic flux Θ 604 in the first magnetic flux circuit. Moreover, to the extent that magnetic flux Θ 502, circulated and pooled in the second magnetic flux circuit during the previous half-cycle of $V_{AC}$, now flows to the first magnetic flux circuit, the current $I_{AC}$ driven through the first coil 212 by $V_{AC}$ may be decreased as compared to the first positive cycle shown in FIG. 5. This causes a reduction in power, substantially equivalent to the power in the pool of magnetic flux Θ 502, drawn from the AC power source during the transition from the previous negative half-cycle to the subsequent positive half-cycle of $V_{AC}$. The end result of the operation shown in FIG. 6 is operation as shown in FIG. 4.

Thus, implementations as described in connection with FIGS. 4-6 provide a charging system that provides varying proportions of magnetic flux that resonate between a first magnetic flux circuit that directly contributes to charging the battery 218, and circulating in a second magnetic flux circuit to provide a pool of magnetic flux. Such resonant behavior is based on the waveform of $V_{AC}$, on a maximum charging voltage, and on a maximum charging current accepted by the battery 218 during each positive half-cycle of $V_{AC}$. Thus, in a sense, the charging system of FIGS. 4-6 charge according to a resonance between the AC voltage $V_{AC}$ applied across the first coil 212 and an equivalent impedance presented by the combination of the second coil 214 and the battery 218.

Figure 7:
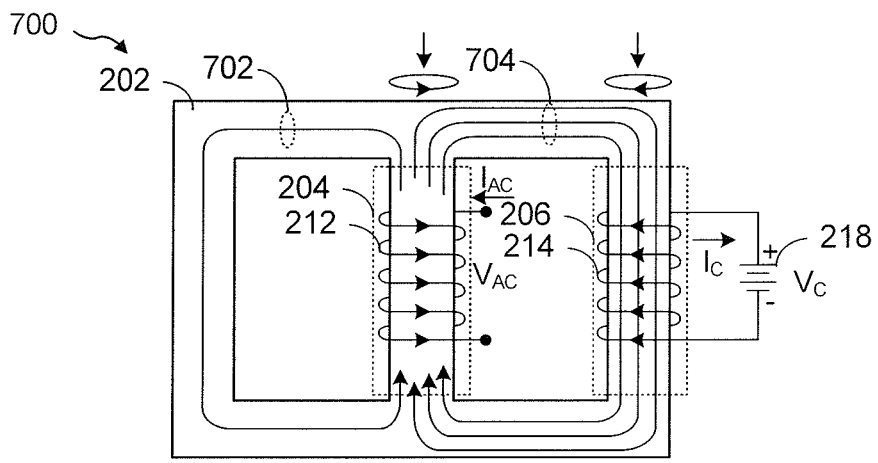
FIG. 7 is a hybrid schematic/functional block diagram of another apparatus for charging an electrically chargeable device utilizing resonating magnetic oscillations in the apparatus operating under application of a positive half cycle of the alternating voltage shown in FIG. 3, in accordance with some implementations.

The present application further contemplates implementations that do not utilize the rectifying diode 216 previously described in connection with FIGS. 2 and 4-6. FIG. 7 is a hybrid schematic/functional block diagram 700 of another apparatus for charging an electrically chargeable device utilizing resonating magnetic oscillations in the apparatus operating under application of a positive half cycle of the alternating voltage $V_{AC}$ shown in FIG. 3, in accordance with some implementations. The diagram 700 shows substantially all of the same features as previously described in connection with FIG. 2 with the exception that the diode 216 is not present. Thus, the same numerals have been utilized for the same features. In some implementations, the second coil 214 may be directly connected to the battery 218. In some other implementations, a capacitor may be connected in either series or parallel with the second coil 214 and the battery 218. The operation shown in FIG. 7 is the same as that previously described in connection with FIG. 4 with the exception that no forward-biasing of the diode 216 is needed since it is not present. Thus, the magnetic flux Θ 702, 704 may correspond to the magnetic flux Θ 402, 404, respectively.

Figure 8:
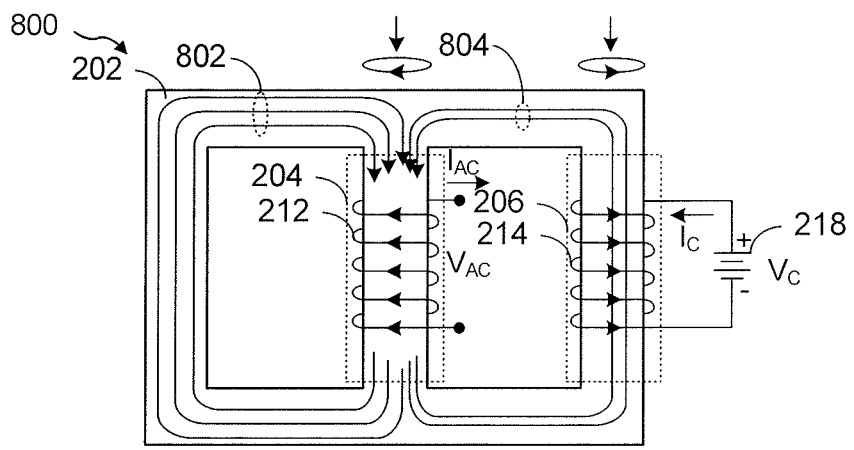
FIG. 8 is a hybrid schematic/functional block diagram of the apparatus of FIG. 7 operating under application of a negative half cycle of the alternating voltage shown in FIG. 3, in accordance with some implementations.

FIG. 8 is a hybrid schematic/functional block diagram 800 of the apparatus of FIG. 7 operating under application of a negative half cycle of the alternating voltage $V_{AC}$ shown in FIG. 3, in accordance with some implementations. In FIG. 8, the first coil 212 is now driven with a second half cycle (e.g., the negative half cycle) of the alternating voltage $V_{AC}$. The current $I_{AC}$ is now driven by $V_{AC}$ through the first coil 212 in a clockwise direction when viewed in the direction of the arrow down at the first coil 212. According to the right-hand rule, the current $I_{AC}$, circulating clockwise in the first coil 212, causes magnetic flux Θ 802, 804 to flow in the core structure 202 as shown by the arrows circulating in the first and second magnetic flux circuits. As shown, the magnetic flux Θ 802, 804 circulate in opposite clockwise and counter-clockwise directions from one another. These directions of circulation are opposite from those previously described for magnetic flux Θ 702, 704, with respect to FIG. 7. The magnetic flux Θ 804 flows through the first magnetic flux circuit, passing through the second portion 206 of the core structure 202, on or around which is wound the second coil 214. However, a voltage induced across the terminals of the second coil 214 is opposite of the polarity required to drive current $I_C$ into the battery 218. Thus, a small amount of current from the battery 218 will flow back into the second coil 214 as shown by the arrows. The flow of current $I_C$ in this reverse direction adds to the induced magnetic flux Θ 804 flowing in the first magnetic flux circuit. This addition to the magnetic flux Θ 804 will circulate back through the first portion 204 and, by magnetic induction, reduce an amount of current $I_{AC}$ driven into the first coil 212 as compared to the implementation shown in FIG. 5, reducing the power drawn from the AC power supply during this half cycle. The reduced power drawn from the AC power source will circulate in the second magnetic flux circuit during this half cycle. As previously described in connection with FIG. 5, since the reluctance $\mathcal{R}$ 2 of the second magnetic flux circuit is less than the reluctance $\mathcal{R}$ 1 of the first magnetic flux circuit when the negative half cycle of the alternating voltage $V_{AC}$ drives the first coil 212, substantially more magnetic flux Θ 802 flows in the second magnetic flux circuit as compared to the magnetic flux Θ 804 flowing in the first magnetic flux circuit. It is by the mechanisms described in connection with FIG. 8 that rectification utilizing active components, such as diodes or transistors, is not necessary. Although clockwise and counter-clockwise conventions are described above, they are not limiting and may be reversed from one another since they are based on the particular implementation shown in FIG. 8.

Figure 9:
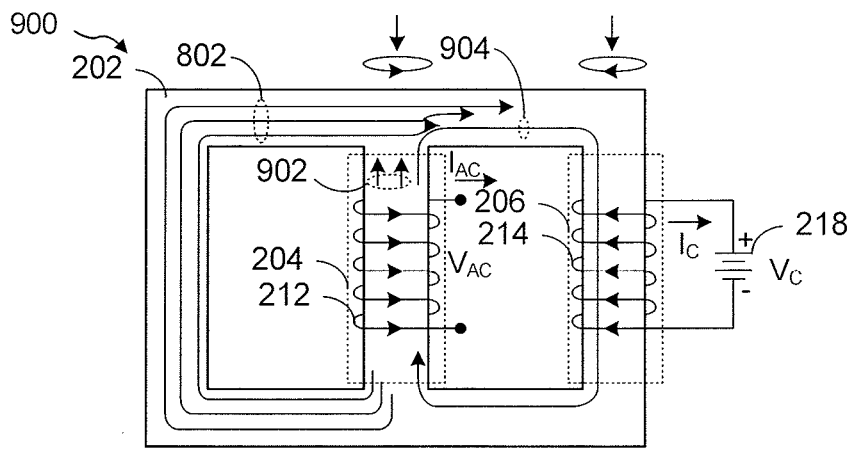
FIG. 9 is a hybrid schematic/functional block diagram of the apparatus of FIG. 7 operating at a transition between the negative half cycle and a subsequent positive half cycle of the alternating voltage shown in FIG. 3, in accordance with some implementations.

FIG. 9 is a hybrid schematic/functional block diagram 900 of the apparatus of FIG. 7 operating at a transition between the negative half cycle and a subsequent positive half cycle of the alternating voltage $V_{AC}$ shown in FIG. 3, in accordance with some implementations. The operation shown in FIG. 9 may apply after at least one full cycle of $V_{AC}$ has been driven to the first coil 212 including the operation shown in FIG. 7 for the positive half-cycle of $V_{AC}$ and the operation shown in FIG. 8 for the negative half-cycle of $V_{AC}$. The operation shown in FIG. 7 is the same as that previously described in connection with FIG. 6 with the exception that no forward-biasing of the diode 216 is needed since it is not present. Thus, the magnetic flux Θ 902, 904 may correspond to the magnetic flux Θ 602, 604, respectively. The end result would be operation as shown in FIG. 7.

Thus, implementations as described in connection with FIGS. 4-6 provide a charging system that provides varying proportions of magnetic flux that resonate between a first magnetic flux circuit that directly contributes to charging the battery 218, and circulating in a second magnetic flux circuit to provide a pool of magnetic flux. Such resonant behavior is based on the waveform of $V_{AC}$, on a maximum charging voltage, and on a maximum charging current accepted by the battery 218 during each positive half-cycle of $V_{AC}$. Thus, in a sense, the charging system of FIGS. 4-6 charge according to a resonance between the AC voltage $V_{AC}$ applied across the first coil 212 and an equivalent impedance presented by the combination of the second coil 214 and the battery 218.

Figure 10:
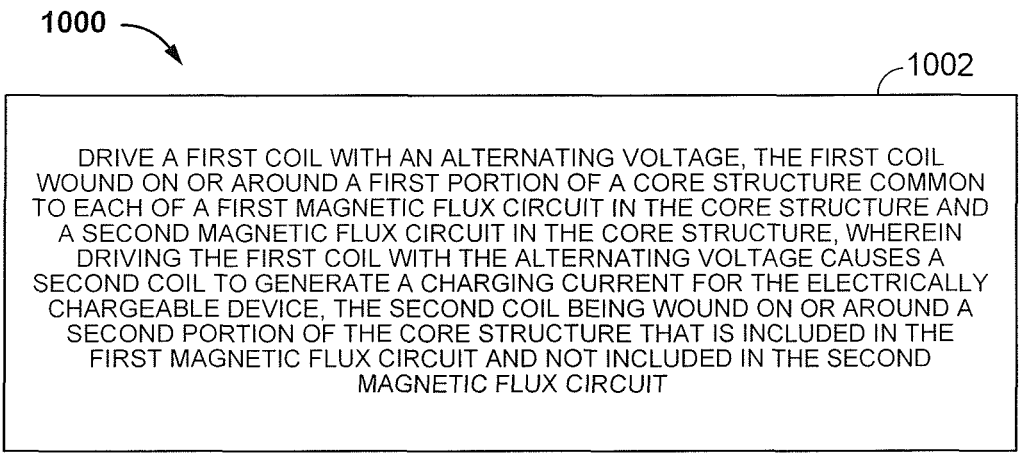
FIG. 10 is a flowchart depicting a method for charging an electrically chargeable device utilizing resonating magnetic oscillations in the apparatus, in accordance with an exemplary implementation.

FIG. 10 is a flowchart 1000 depicting a method for charging an electrically chargeable device utilizing resonating magnetic oscillations between the apparatus and the electrically chargeable device, in accordance with an exemplary implementation. The flowchart 1000 is described herein with reference to FIGS. 2-9. In an implementation, one or more of the blocks in flowchart 1000 may be performed by an apparatus for charging an electrically chargeable device utilizing resonating magnetic oscillations between the apparatus and the electrically chargeable device, such as the apparatus 200 as shown in any of FIGS. 2 and 4-9. Although the flowchart 1000 is described herein with reference to a particular order, in various implementations, blocks herein may be performed in a different order, or omitted, and additional blocks may be added.

The flowchart 1000 may begin with operation block 1002, which includes driving a first coil with an alternating voltage, the first coil wound on or around a first portion of a core structure common to each of a first magnetic flux circuit in the core structure and a second magnetic flux circuit in the core structure, wherein driving the first coil with the alternating voltage causes a second coil to generate a charging current for the electrically chargeable device, the second coil being wound on or around a second portion of the core structure that is included in the first magnetic flux circuit and not included in the second magnetic flux circuit. For example, as previously described in connection with FIGS. 2 and 4-9, the first coil 212 driven by the alternating voltage $V_{AC}$. The first coil 212 is wound on or around the first portion 204 of a core structure 202. The first portion 204 is common to each of a first magnetic flux circuit 208 in the core structure 202 and a second magnetic flux circuit 210 in the core structure 202. Moreover, a charging current $I_C$ is provided to the electrically chargeable device (e.g., the battery 218, a capacitor, or the device in which the battery 218 is disposed) from the second coil 214. The second coil 214 is wound on or around the second portion 206 of the core structure 202. The second portion 206 is included in the first magnetic flux circuit 208 and not included in the second magnetic flux circuit 210.

Figure 11:
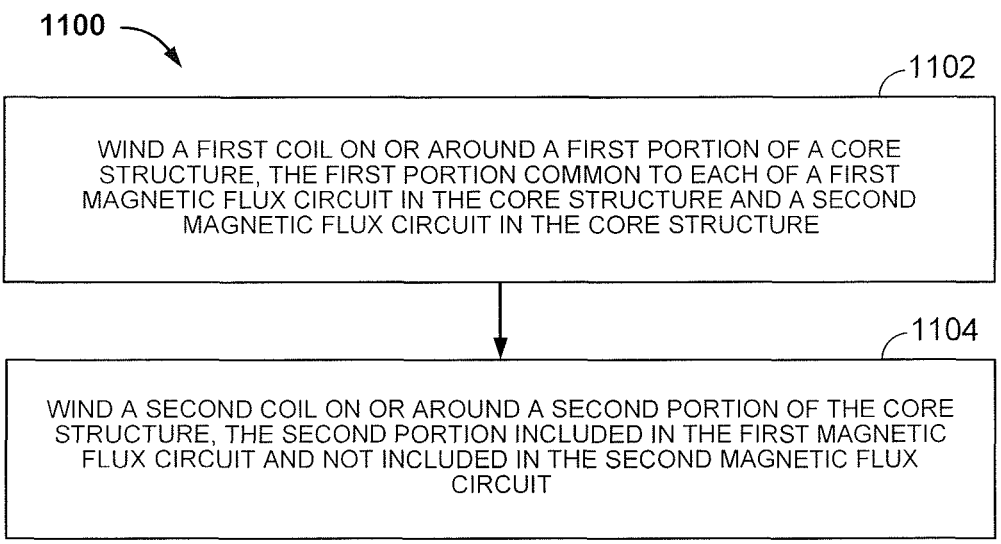
FIG. 11 is a flowchart depicting a method for manufacturing an apparatus for charging an electrically chargeable device utilizing resonating magnetic oscillations in the apparatus, in accordance with an exemplary implementation.

FIG. 11 is a flowchart 1100 depicting a method for manufacturing an apparatus for charging an electrically chargeable device utilizing resonating magnetic oscillations between the apparatus and the electrically chargeable device, in accordance with an exemplary implementation. The flowchart 1100 is described herein with reference to FIGS. 2 and 4-9. In an implementation, one or more of the blocks in flowchart 1100 may be performed by a worker or a machine manufacturing the apparatus 200 for charging an electrically chargeable device utilizing resonating magnetic oscillations in the apparatus as shown in any of FIGS. 2 and 4-9, respectively. Although the flowchart 1100 is described herein with reference to a particular order, in various implementations, blocks herein may be performed in a different order, or omitted, and additional blocks may be added.

The flowchart 1100 may begin with operation block 1102, which includes winding a first coil around a first portion of a core structure, the first portion common to each of a first magnetic flux circuit in the core structure and a second magnetic flux circuit in the core structure. For example, as previously described in connection with FIGS. 2 and 4-9, the first coil 212 is wound on or around the first portion 204 of the core structure 202. The first portion 206 is common to each of the first magnetic flux circuit 208 in the core structure 202 and the second magnetic flux circuit 210 in the core structure 202.

In some implementations, the core structure may comprise a single machined piece of ferrimagnetic material, such as ferrite, or may alternatively be formed from a plurality of laminated ferrimagnetic layers built up to form the structure. In some implementations, some of the laminated ferrimagnetic layers (or some portions thereof) may comprise ferrimagnetic materials having different magnetic permeabilities from some other of the laminated ferrimagnetic layers (or portions thereof).

The flowchart 1100 may then advance to operation block 1104, which includes winding a second coil around a second portion of the core structure, the second portion included in the first magnetic flux circuit and not included in the second magnetic flux circuit. For example, as previously described in connection with FIGS. 2 and 4-9, the second coil 214 is wound on or around the second portion 206 of the core structure 202. The second portion 206 is included in the first magnetic flux circuit 208 and not included in the second magnetic flux circuit 210.

In some implementations, the apparatus for charging an electrically chargeable device as previously described in connection with any of FIGS. 2-11 may be formed in or as a chip or integrated circuit. In such implementations, the first and second coils as well as the core structure may be formed via any suitable method of manufacture including but not limited to a plurality of lithography and or chemical deposition steps, as may be known in the art.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Combinations of the above should also be included within the scope of computer readable media. The processor and the storage medium may reside in an ASIC. The ASIC may reside in a user device. In the alternative, the processor and the storage medium may reside as discrete components in a user device.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for charging an electrically chargeable device, comprising:
    a core structure comprising:
        a first portion common to each of a first magnetic flux circuit in the core structure and a second magnetic flux circuit in the core structure; and
        a second portion included in the first magnetic flux circuit and not included in the second magnetic flux circuit;
    a first coil wound on or around the first portion and configured to be driven by an alternating voltage; and
    a second coil wound on or around the second portion and configured to be electrically coupled to the electrically chargeable device, wherein:
        a first magnetic reluctance of the first magnetic flux circuit is less than a second magnetic reluctance of the second magnetic flux circuit when the first coil is driven with a first half-cycle of the alternating voltage;
        the first magnetic reluctance of the first magnetic flux circuit is greater than the second magnetic reluctance of the second magnetic flux circuit when the first coil is driven with a second half-cycle of the alternating voltage; and
        no coil is wound on or around any portion of the second magnetic flux circuit that is not included in the first portion.

2. The apparatus of claim 1, wherein magnetic flux circulating in the second magnetic flux circuit forms a pool of magnetic flux in the second magnetic flux circuit during at least one of a first half-cycle and a second half-cycle of the alternating voltage.

3. The apparatus of claim 1, wherein the core structure is configured such that magnetic flux circulates in the first magnetic flux circuit in an opposite clockwise or counter-clockwise direction compared to magnetic flux that simultaneously circulates in the second magnetic flux circuit.

4. The apparatus of claim 1, comprising an alternating voltage source electrically coupled to the first coil.

5. The apparatus of claim 1, comprising the electrically chargeable device electrically coupled to the second coil.

6. The apparatus of claim 1, comprising a diode electrically coupled to the second coil.

7. The apparatus of claim 1, wherein the first magnetic flux circuit comprises a first closed loop of ferrimagnetic material and the second magnetic flux circuit comprises a second closed loop of ferrimagnetic material, wherein the first portion of the core structure is part of each of the first and second closed loops of ferrimagnetic material.

8. The apparatus of claim 1, wherein the core structure is configured such that:
the charging current flows into the electrically chargeable device and magnetic flux in the first magnetic circuit exceeding an amount required to generate the charging current is shunted to the second magnetic circuit when the first coil is driven with a first half-cycle of the alternating voltage; and
magnetic flux is pooled in the second magnetic circuit when the first coil is driven with a second half-cycle of the alternating voltage.

9. A method for charging an electrically chargeable device, comprising:
driving a first coil with an alternating voltage, the first coil wound on or around a first portion of a core structure common to each of a first magnetic flux circuit in the core structure and a second magnetic flux circuit in the core structure,
wherein driving the first coil with the alternating voltage causes a second coil to generate a charging current for the electrically chargeable device, the second coil being wound on or around a second portion of the core structure that is included in the first magnetic flux circuit and not included in the second magnetic flux circuit, and wherein:
a first magnetic reluctance of the first magnetic flux circuit is less than a second magnetic reluctance of the second magnetic flux circuit when the first coil is driven with a first half-cycle of the alternating voltage;
the first magnetic reluctance of the first magnetic flux circuit is greater than the second magnetic reluctance of the second magnetic flux circuit when the first coil is driven with a second half-cycle of the alternating voltage; and
no coil is wound on or around any portion of the second magnetic flux circuit that is not included in the first portion.

10. The method of claim 6, further comprising storing magnetic flux circulating in the second magnetic flux circuit during at least one of a first half-cycle and a second half-cycle of the alternating voltage.

11. The method of claim 6, wherein magnetic flux circulates in the first magnetic flux circuit in an opposite clockwise or counter-clockwise direction compared to magnetic flux that simultaneously circulates in the second magnetic flux circuit.

12. The method of claim 6, wherein:
the charging current flows into the electrically chargeable device and magnetic flux in the first magnetic circuit exceeding an amount required to generate the charging current is shunted to the second magnetic circuit when the first coil is driven with a first half-cycle of the alternating voltage; and
magnetic flux is pooled in the second magnetic circuit when the first coil is driven with a second half-cycle of the alternating voltage.

13. The method of claim 6, further comprising connecting an alternating voltage source that provides the alternating voltage to the first coil.

14. The method of claim 6, further comprising connecting the electrically chargeable device to the second coil.

15. A method for manufacturing an apparatus for charging an electrically chargeable device, comprising:
providing a core structure comprising:
a first portion common to each of a first magnetic flux circuit in the core structure and a second magnetic flux circuit in the core structure; and
a second portion included in the first magnetic flux circuit and not included in the second magnetic flux circuit;
winding a first coil on or around the first portion of a core structure; and
winding a second coil on or around the second portion of the core structure, wherein:
a first magnetic reluctance of the first magnetic flux circuit is less than a second magnetic reluctance of the second magnetic flux circuit when the first coil is driven with a first half-cycle of an alternating voltage;
the first magnetic reluctance of the first magnetic flux circuit is greater than the second magnetic reluctance of the second magnetic flux circuit when the first coil is driven with a second half-cycle of the alternating voltage, the second portion included in the first magnetic flux circuit and not included in the second magnetic flux circuit; and
no coil is wound on or around any portion of the second magnetic flux circuit that is not included in the first portion.

16. The method of claim 15, wherein the core structure comprises a ferrimagnetic material.

* * * * *